(12) United States Patent
Niergarth et al.

(10) Patent No.: US 10,374,477 B2
(45) Date of Patent: Aug. 6, 2019

(54) ELECTRIC MACHINE WITH SEPARABLE MAGNET CARRIER

(71) Applicant: General Electric Company, Schenectady, NY (US)

(72) Inventors: Daniel Alan Niergarth, Cincinnati, OH (US); Darek Tomasz Zatorski, Fort Wright, KY (US); David William Crall, Loveland, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/461,654

(22) Filed: Mar. 17, 2017

(65) Prior Publication Data

US 2018/0269737 A1 Sep. 20, 2018

(51) Int. Cl.
| | | |
|---|---|---|
| *H02K 1/30* | (2006.01) | |
| *F01D 15/10* | (2006.01) | |
| *F01D 1/00* | (2006.01) | |
| *F04D 19/00* | (2006.01) | |
| *H02K 7/18* | (2006.01) | |

(Continued)

(52) U.S. Cl.
CPC ............... *H02K 1/30* (2013.01); *F01D 1/00* (2013.01); *F01D 15/10* (2013.01); *F04D 19/002* (2013.01); *H02K 1/2793* (2013.01); *H02K 7/1823* (2013.01); *F05D 2220/32* (2013.01); *H02K 21/24* (2013.01)

(58) Field of Classification Search
CPC ...... H02K 1/30; H02K 1/2793; H02K 7/1823; F01D 1/00; F01D 15/10; F04D 19/002; F05D 2220/32
See application file for complete search history.

(56) References Cited

U.S. PATENT DOCUMENTS

| | | | | |
|---|---|---|---|---|
| 2,446,999 A | * | 8/1948 | Guglielmo | ............ H01F 41/024 |
| | | | | 174/DIG. 24 |
| 2,837,671 A | * | 6/1958 | Reardon | ................ H01R 39/04 |
| | | | | 310/236 |

(Continued)

FOREIGN PATENT DOCUMENTS

| | | |
|---|---|---|
| DE | 42 14 483 A1 | 11/1993 |
| EP | 2128419 A1 | 12/2009 |

(Continued)

OTHER PUBLICATIONS

U.S. Appl. No. 15/354,370, filed Nov. 17, 2016.

(Continued)

*Primary Examiner* — Julio C. Gonzalez
*Assistant Examiner* — Joseph Ortega
(74) *Attorney, Agent, or Firm* — Dority & Manning, P.A.

(57) ABSTRACT

The present disclosure is directed to an electric machine defining a longitudinal direction, a radial direction, and a circumferential direction, and an axial centerline defined along the longitudinal direction. The electric machine includes a rotor assembly that includes a plurality of carriers arranged along the circumferential direction. Each pair of carriers defines a carrier gap therebetween along the circumferential direction, and each carrier includes a rotor magnet. The rotor assembly further includes an outer ring radially outward of and surrounding the plurality of carriers along the circumferential direction, the outer ring defining a unitary structure.

20 Claims, 4 Drawing Sheets

(51) Int. Cl.
   *H02K 1/27*       (2006.01)
   *H02K 21/24*      (2006.01)

(56) References Cited

U.S. PATENT DOCUMENTS

| | | | | |
|---|---|---|---|---|
| 3,478,421 | A * | 11/1969 | Preece | H01R 39/06 |
| | | | | 29/597 |
| 4,433,261 | A * | 2/1984 | Nashiki | H02K 1/278 |
| | | | | 310/156.28 |
| 4,433,473 | A * | 2/1984 | Benedetti | H02K 1/2786 |
| | | | | 29/598 |
| 4,860,537 | A * | 8/1989 | Taylor | F02C 3/067 |
| | | | | 60/226.1 |
| 5,300,845 | A * | 4/1994 | Fanning | H02K 44/06 |
| | | | | 310/216.061 |
| 5,925,961 | A * | 7/1999 | Sugiyanma | H01R 39/06 |
| | | | | 29/597 |
| 8,464,511 | B1 * | 6/2013 | Ribarov | B64C 11/48 |
| | | | | 60/226.1 |
| 9,024,504 | B2 * | 5/2015 | Nishio | H01R 43/06 |
| | | | | 310/233 |
| 9,494,077 | B2 | 11/2016 | Chanez et al. | |
| 2010/0133835 | A1 * | 6/2010 | Dooley | F01D 15/10 |
| | | | | 290/52 |
| 2011/0273034 | A1 * | 11/2011 | Yamamoto | H02K 1/2793 |
| | | | | 310/44 |
| 2016/0226326 | A1 * | 8/2016 | Gotschmann | H02K 1/2746 |
| 2016/0241096 | A1 * | 8/2016 | Mueller | H02K 1/278 |
| 2016/0243719 | A1 * | 8/2016 | Ohshima | H02K 15/03 |
| 2016/0294237 | A1 * | 10/2016 | Bouarroudj | H02K 1/2773 |
| 2016/0359394 | A1 * | 12/2016 | Zheng | H02K 11/01 |
| 2017/0047807 | A1 * | 2/2017 | Manz | H02K 3/345 |
| 2017/0126087 | A1 * | 5/2017 | Soderberg | H02K 21/042 |
| 2017/0155307 | A1 * | 6/2017 | Hayslett | H02P 29/02 |
| 2017/0274992 | A1 * | 9/2017 | Chretien | B64C 27/14 |
| 2017/0302116 | A1 * | 10/2017 | Oshida | H02K 1/30 |
| 2018/0127103 | A1 * | 5/2018 | Cantemir | H02K 21/225 |

FOREIGN PATENT DOCUMENTS

| | | | | |
|---|---|---|---|---|
| FR | 3 027 468 A1 | | 4/2016 | |
| GB | 2372157 A | * | 8/2002 | F01D 5/14 |
| JP | 2008-278590 A | | 11/2008 | |

OTHER PUBLICATIONS

Extended European Search report and Opinion issued in connection with corresponding EP Application No. 18160924.9 dated Jul. 19, 2018.

Office Action issued in connection with corresponding CA Application No. 2997806 dated Oct. 2, 2018.

* cited by examiner

ELECTRIC MACHINE WITH SEPARABLE MAGNET CARRIER

FIELD

The present subject matter relates generally to an electric machine, and more particularly, to a high speed electric machine.

BACKGROUND

Electric machines, e.g., electric motors and generators, are used in a variety of industries to convert electrical energy to mechanical energy, and vice versa, for useful purposes. For example electric machines are used in the automotive, aviation, maritime, and other industries to operate aircrafts, helicopters, automobiles, boats, submarines, trains, and/or any other suitable vehicles.

To reduce fuel consumption and improve propulsive efficiency, it is generally desirable to use electric machines with large power densities, referred to herein as the electric machine's specific power or power-to-weight ratio. Electric machines having a high specific power may be smaller and more lightweight while generating equivalent or greater power than heavier electric machines.

Increasing rotational speeds of electric machines is known to increase power-to-weight ratios. However, as rotational speeds increase, the stresses on the various rotating components of the electric machine also increase. As a result the retaining structure for holding the rotating components of the electric machine must be larger and heavier, thus increasing costs, size, and weight. For example, certain electric machines use a disk retaining structure which allows for much higher tip speeds and power densities than conventional machines. However, as the rotor disk experiences large centrifugal forces during high speed operation, the stresses exerted on rotor disk by the rotor components may limit the ability of the electric machine to reach higher speeds.

Accordingly, an electric machine with features for improving specific power and efficiency is desirable. More specifically, an electric machine with features for enabling high speed operation of the electric machine to improve performance and specific power would be particularly beneficial.

BRIEF DESCRIPTION

Aspects and advantages of the invention will be set forth in part in the following description, or may be obvious from the description, or may be learned through practice of the invention.

The present disclosure is directed to an electric machine defining a longitudinal direction, a radial direction, and a circumferential direction, and an axial centerline defined along the longitudinal direction. The electric machine includes a rotor assembly that includes a plurality of carriers arranged along the circumferential direction. Each pair of carriers defines a carrier gap therebetween along the circumferential direction, and each carrier includes a rotor magnet. The rotor assembly further includes an outer ring radially outward of and surrounding the plurality of carriers along the circumferential direction, the outer ring defining a unitary structure.

In various embodiments, the rotor assembly further includes a hub disposed radially inward of the plurality of carriers, wherein the hub is coupled to each carrier. In still various embodiments, the hub includes a plurality of members, wherein each member is coupled to each carrier. In one embodiment, each member defines a first portion and a second portion, in which the second portion is coupled to the carrier and the first portion is coupled to an inner ring of the hub. In another embodiment, each member defines a second portion and a third portion, in which the third portion is disposed toward a first end of each carrier and the second portion is disposed toward a second end of each carrier opposite of the first end along the longitudinal direction, and each carrier is retained within each member along the longitudinal direction and/or circumferential direction. In yet another embodiment, the hub further includes an inner ring to which the plurality of members is coupled.

In one embodiment, the outer ring defines a tangential stress carrying member.

In another embodiment, the electric machine defines a load path from the hub to each carrier to the outer ring.

In yet another embodiment, the electric machine defines a load path from the inner ring of the hub to each of the plurality of members, and from each member to each carrier, and from the plurality of carriers to the outer ring.

In various embodiments, the electric machine further includes a stator assembly adjacent along the longitudinal direction to the plurality of carriers. In one embodiment, the stator assembly includes a plurality of stator conductors adjacent to the rotor magnet of each carrier, and a clearance gap is defined between the stator conductor and the rotor magnet.

In still various embodiments, the outer ring comprises a ceramic matrix composite, a metal matrix composite, or a polymer matrix composite. In one embodiment, the outer ring comprises a plurality of fibers, and wherein the fibers include para-aramid synthetic fibers, metal fibers, ceramic fibers, glass fibers, carbon fibers, boron fibers, p-phenylenetherephtalamide fibers, aromatic polyamide fibers, silicon carbide fibers, graphite fibers, nylon fibers, ultra-high molecular weight polyethylene fibers, or mixtures thereof.

Another aspect of the present disclosure is directed to a gas turbine engine defining a longitudinal direction, a radial direction, and a circumferential direction, and an axial centerline defined along the longitudinal direction. The engine includes an electric machine and a driveshaft. The driveshaft is extended along the longitudinal direction and rotatable about the axial centerline. The electric machine includes a plurality of carriers arranged along the circumferential direction, in which each pair of carriers defines a carrier gap therebetween, and each carrier includes a rotor magnet. The electric machine further includes an outer ring radially outward of and surrounding the plurality of carriers along the circumferential direction, in which the outer ring defines a unitary structure. The electric machine further includes a hub disposed radially inward of the plurality of carriers, in which the hub retains each carrier along at least the longitudinal direction and the circumferential direction. The hub defines an inner ring coupled to the driveshaft.

In various embodiments, the electric machine further defines a plurality of members. In one embodiment, each member of the electric machine defines a first portion and a second portion, in which the second portion is coupled to each carrier and the first portion is coupled to an inner ring of the hub. In another embodiment, each member defines a second portion and a third portion, wherein the third portion is disposed toward a first end of each carrier and the second portion is disposed toward a second end of each carrier opposite of the first end along the longitudinal direction, and wherein each carrier is retained within each member along the longitudinal direction and/or circumferential direction.

In one embodiment, the inner ring of the hub is coupled to the driveshaft.

In another embodiment, the driveshaft defines a low pressure shaft, intermediate pressure shaft, or a high pressure shaft.

In yet another embodiment, the engine further includes a stator assembly adjacent along the longitudinal direction to the plurality of carriers. The stator assembly includes a plurality of stator conductors adjacent to the rotor magnet of each carrier, and a clearance gap is defined between the stator conductor and the rotor magnet.

In still another embodiment, the engine further includes a frame disposed within a fan assembly, a compressor section, or a turbine section, and wherein the stator assembly is coupled to the frame.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
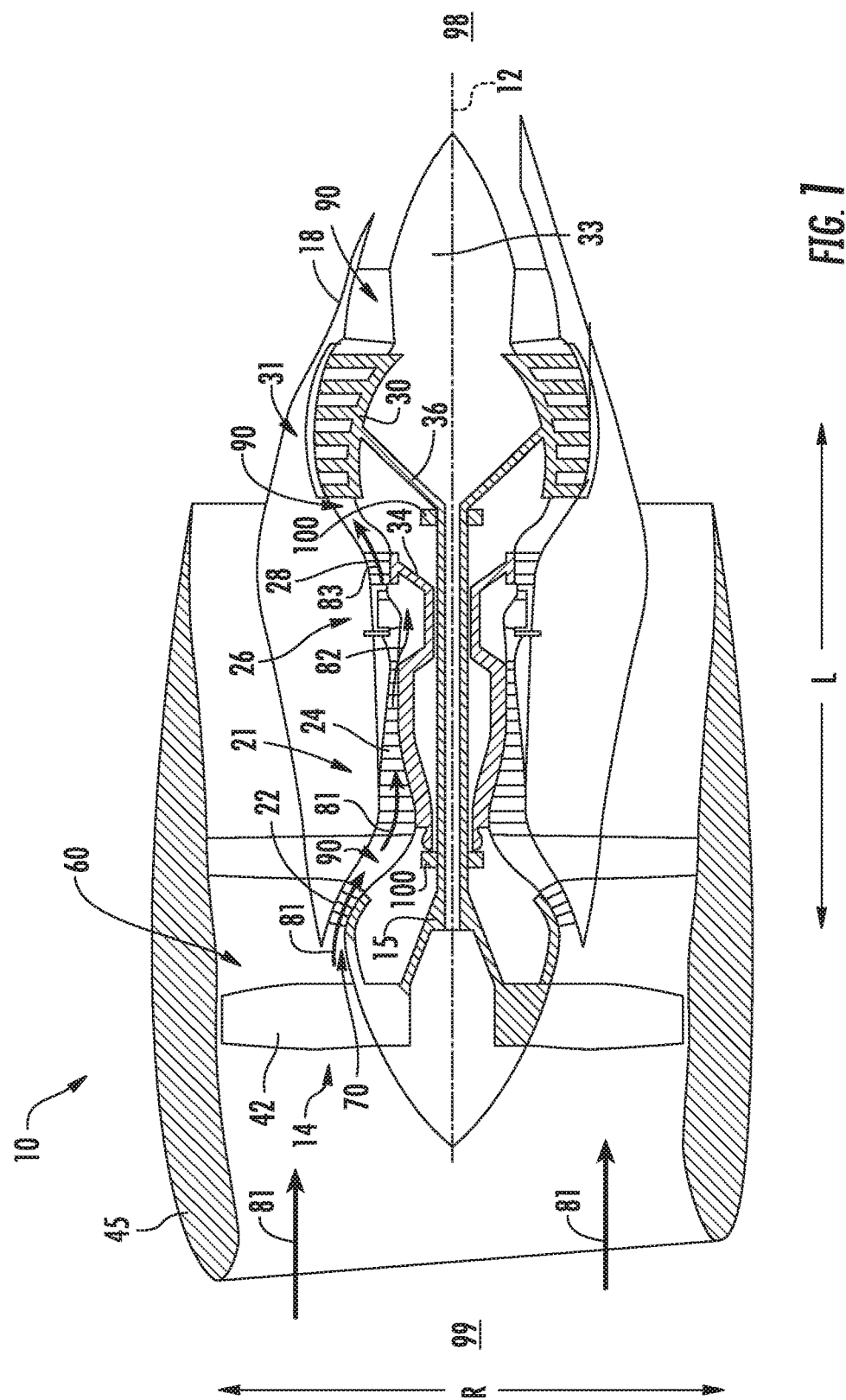
FIG. 1 is a schematic cross sectional view of an exemplary embodiment of a gas turbine engine including embodiments of the electric machine of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of an electric machine with features for improving specific power and efficiency are generally provided. The embodiments of the electric machine shown and described herein may enable high speed operation of the electric machine to improve performance and specific power. The electric machine includes magnetic carriers separated along a circumferential direction that may disable transfer of hoop stresses from one carrier to another along the circumferential direction. The electric machine further includes an outer ring to which the magnetic carriers are attached at an inner diameter thereof. The outer ring generally defines an annular load bearing ring to which hoop stresses and centrifugal loads are transferred from the carriers. The embodiments of the electric machine shown and described herein may improve power to weight ratio (i.e., specific power) and enable high speed operation of the electric machine.

Referring now to the figures, in FIG. 1 an exemplary embodiment of a gas turbine engine 10 (herein after, "engine 10") including one or more electric machines 100 is generally provided. The engine 10 defines a longitudinal direction L, a radial direction R, and a circumferential direction C (shown in FIG. 2). The engine 10 further defines an axial centerline 12 for reference purposes extended along the longitudinal direction L. The engine 10 includes, in serial flow arrangement along a longitudinal direction L, a fan assembly 14, a compressor section 21, a combustor section 26, a turbine section 31, and an exhaust nozzle assembly 33. The engine 10 further defines a first end 99 and a second end 98. In various embodiments, the first end 99 may define an upstream end from which air enters the engine 10, such as air 81 as schematically shown in FIG. 1. In still various embodiments, the second end 98 may define a downstream end at which air or combustion gases exits the engine 10, such as combustion gases 83 as schematically shown in FIG. 1. However, in other embodiments, the first end 99 and the second end 98 may generally represent opposite ends along the longitudinal direction L to or from which a fluid, flux, or feature may move or be disposed.

The compressor section 21 generally includes a low pressure (LP) compressor 22 and a high pressure (HP) compressor 24 in serial flow arrangement from the first end 99 defining the upstream end to the second end 98 defining the downstream end. The turbine section 31 generally includes an HP turbine 28 and an LP turbine 30 in serial flow arrangement from the first end 99 defining the upstream end to the second end 98 defining the downstream end. The combustion section 26 is disposed between the HP compressor 24 and the HP turbine 28. The HP compressor 24 and the HP turbine 28, with an HP shaft 34 rotatably coupling each, together define an HP spool.

The fan assembly 14 includes a plurality of fan blades 42 rotatably coupled to a fan rotor 15. The fan rotor 15 is rotatably coupled toward the first end 99 of an LP shaft 36 extended along the longitudinal direction L. The LP turbine 30 is coupled to the LP shaft 36 and disposed at the second end 98 of the LP shaft 36. The fan assembly 14, LP compressor 22, LP shaft 36, and the LP turbine 30 together define an LP spool.

Though the exemplary embodiment of the engine 10 shown in FIG. 1 is configured as a two spool turbofan engine, it should be understood that the engine 10 may be configured as a three spool turbofan engine. For example, the engine 10 may further include an intermediate pressure (IP) compressor disposed between the fan assembly 14 and the HP compressor 24. In various embodiments, the IP compressor may be disposed between the LP compressor 22 and the HP compressor 24. The engine 10 may further include an IP turbine disposed between the HP turbine 28 and the LP turbine 30. The IP turbine and the IP compressor may be coupled to and rotatable with an IP shaft. In still various embodiments, the engine 10 may further include a reduction gearbox between the fan assembly 14 and the engine core defined at least partially by the compressor section 21 and the turbine section 31.

In still various embodiments, the engine 10 may be configured as a turboshaft, turboprop, or propfan engine. The electric machine 100 and/or the engine 10 may be scaled or configured for application in aviation, aerospace, automotive, locomotive, or marine apparatuses, and/or as power generation units, such as auxiliary power units.

During operation of the engine 10, a drive motor begins rotation of the HP spool, which introduces air, shown schematically as arrows 81, into a core flowpath 70 of the engine 10. The air 81 passes across successive stages of the LP compressor 22 and the HP compressor 24 and increases in pressure to define compressed air 82 entering the combustion section 26. Fuel is introduced to the combustion section 26 and mixed with the compressed air 82 then ignited to yield combustion gases 83. Energy from the combustion gases 83 drives rotation of the HP turbine 28 and the LP turbine 30, as well as their respective HP and LP spools, and the fan assembly 14 and compressor section 21 to which each are attached.

The cycle of introducing air 81 into the core flowpath 70, mixing with fuel, igniting, and producing combustion gases 83 provides energy to rotate the plurality of fan blades 42 about the axial centerline 12 of the engine 10. A portion of air 81 passes through a bypass duct 60 defined between a nacelle 45 and an outer casing 18 of the engine 10. The outer casing 18 is substantially tubular and surrounding the compressor section 21, the combustion section 26, and the turbine section 31 generally along the longitudinal direction L. In the embodiment described herein, the nacelle 45 may further include a fan case. The outer casing 18 may further include a cowl defining a generally aerodynamic flowpath of the bypass duct 60.

Figure 2:
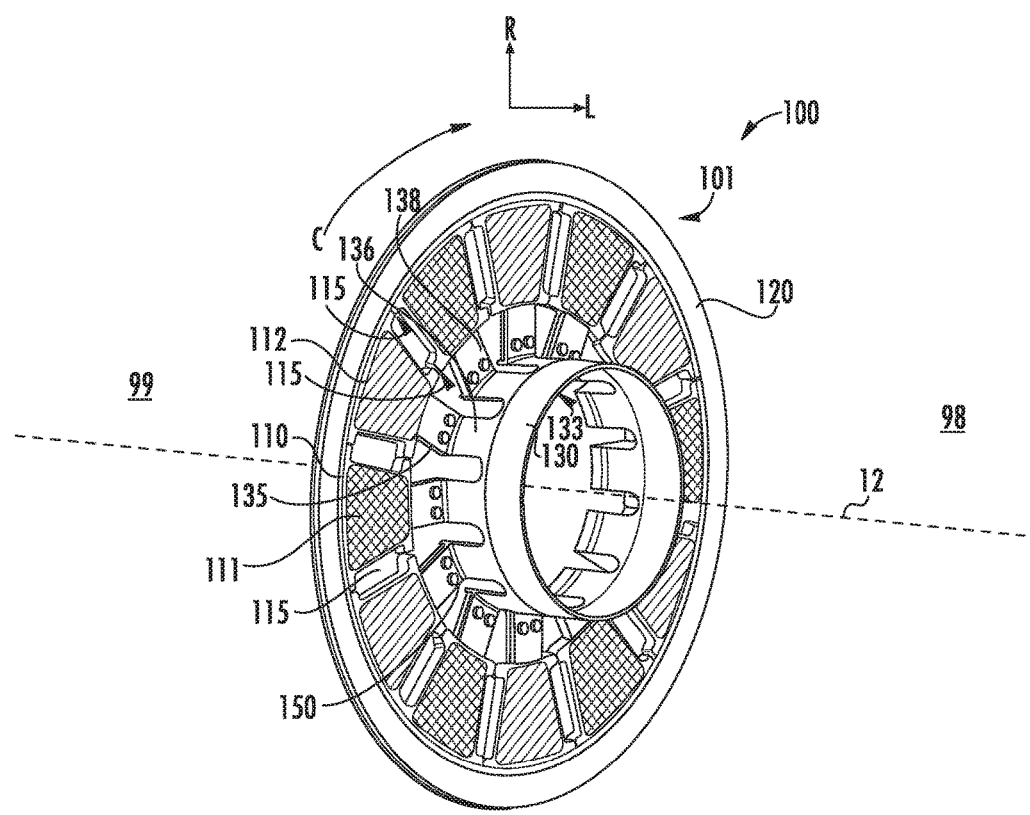
FIG. 2 is a perspective view of an exemplary embodiment of an electric machine according to an aspect of the present disclosure.

Referring now to FIG. 2, an exemplary embodiment of an electric machine 100 is generally provided. The electric machine 100 defines a longitudinal direction L, a radial direction R, and a circumferential direction C, and an axial centerline 12 defined along the longitudinal direction L. In various embodiments, the electric machine 100 shares the same axial centerline 12 as the engine 10.

The electric machine 100 includes a rotor assembly 101 that includes a plurality of carriers 110 arranged along the circumferential direction C. Each pair of carriers 110 defines a carrier gap 115 between each pair of carriers 110 along the circumferential direction C. Each carrier 110 includes a rotor magnet 111, 112 coupled to each carrier 110. The rotor assembly 101 further includes a hub 130 disposed inward along the radial direction R of the plurality of carriers 110. The hub 130 is coupled to each carrier 110.

Each rotor magnet carrier 110 is detached along the circumferential direction C from each adjacent carrier 110, thereby disabling retention or transfer of hoop stresses from one carrier 110 to another about the circumferential direction C or at a tangent from the circumferential direction C. Decoupling the carriers 110 enables expansion and contraction of the rotor assembly 101 at high speeds.

Referring still to FIG. 2, the hub 130 may further include a plurality of members 135. Each member 135 is coupled to each carrier 110. Each member 135 coupled to each carrier 110 may further enable expansion and contraction of the rotor assembly 101 at high speeds. Additionally, each member 135 may further enable a transfer of loads to the hub 130. In various embodiments, the members 135 enable expansion and contraction along the radial direction R of the electric machine 100, such as at each carrier 110. In still various embodiments, the members 135 further provide support, such as rigidity, along the longitudinal direction L.

In various embodiments, the members 135 may include a titanium or titanium alloy, a nickel or nickel alloy, or an aluminum or aluminum alloy material, and wherein each alloy material comprises chromium, cobalt, tungsten, tantalum, molybdenum, and/or rhenium, or combinations thereof. The members 135 may define springing properties enabling expansion and contraction generally along the radial direction R in response to high speeds of the rotor assembly 101 during rotation about the axial centerline 12.

Referring still to FIG. 2, the hub 130 may further include an inner ring 133 to which the plurality of members 135 is coupled. The inner ring 133 is annular and disposed generally concentric to the axial centerline 12. In various embodiments, the inner ring 133 defines an inner diameter corresponding to an outer diameter of a driveshaft of the engine 10. The inner ring 133 may define one or more materials such as those of the members 135 discussed herein. In one embodiment, the driveshaft is the LP shaft 36 shown in FIG. 1. In another embodiment, the driveshaft is the HP shaft 34 shown in FIG. 1. Although not further shown in FIG. 1, in other embodiments the driveshaft may further include the IP shaft coupling the IP compressor and the IP turbine.

In still various embodiments, such as shown in FIG. 2, each member 135 defines a first portion 136 and a second portion 138. The second portion 138 is coupled to the carrier 110 and the first portion 136 is coupled to the inner ring 133. In one embodiment, the first portion 136 defines a generally axial portion of each member 135 extended from the inner ring 133. In another embodiment, the second portion 138 defines a generally radial portion of each member 135 extended from each carrier 110. In various embodiments, each member 135 may define an angled or curved member 135 extended from the inner ring 133 and coupled to each carrier 110. In each embodiment, the member 135 generally enables expansion and contraction along the radial direction R. In still various embodiments, the member 135 further provides general support or rigidity along the longitudinal direction L.

In one embodiment, the rotor assembly 101 further includes an outer ring 120 outward along the radial direction R of the plurality of carriers 110. The outer ring 120 surrounds the plurality of carriers 110 along the circumferential direction C. The plurality of carriers 110 are coupled to an inner diameter of the outer ring 120. The outer ring 120 defines a unitary structure, such as a solid annular ring, to carry loads, such as hoop stresses and/or to counteract centrifugal forces and/or tangential stresses, exerted from the plurality of carriers 110 along the radial direction R and/or along the circumferential direction C, and/or a tangent to the circumferential direction C.

During operation of the engine 10 and the electric machine 100 attached to a driveshaft (e.g., LP shaft 36, HP shaft 34, etc.) of the engine 10, rotation of the driveshaft and the rotor assembly 101 of the electric machine generates hoop stresses and centrifugal forces. These forces are exerted generally outward along the radial direction R and/or along the circumferential direction C. The plurality of carriers 110, in which each pair of carriers 110 defines a carrier gap 115 therebetween along the circumferential direction C, disables transfer of hoop stresses through the plurality of carriers 110. The outer ring 120, to which the plurality of carriers 110 are attached at an inner diameter of the outer ring 120, transfer circumferential and radial loads to the outer ring 120. By transferring loads to the outer ring 120 rather than through the plurality of carriers 110 from one to another along the circumferential direction C, the electric machine 100 may provide improved power to weight ratios (e.g., specific power) and/or operate at higher rotational speeds.

For example, in one embodiment, the electric machine 100 defines a load path from the hub 130 to each carrier 110 to the outer ring 120. More specifically, in another embodiment, the electric machine 100 defines a load path from the inner ring 133 of the hub 130 to each of the plurality of members 135, and from each member 135 to each carrier 110, and from the plurality of carriers 110 to the outer ring 120.

In still various embodiments, the members 135 may enable transfer of loads through the springing properties of the members 135. For example, during operation of the electric machine 100, the members 135 may expand or deflect outward along the radial direction R, thereby displacing the carriers 110 toward the outer ring 120, and in which the outer ring 120 counteracts the forces toward it from the carriers 110. As the forces increase and decrease, the members 135 may expand, contract, or otherwise deflect generally along the radial direction R in response to changes in loads.

In one embodiment, the outer ring 120 includes a ceramic matrix composite, a metal matrix composite, or a polymer matrix composite material defining high strength and/or high modulus of elasticity. In various embodiments, the outer ring 120 may include a plurality of fabric sheets formed from a plurality of fibers. In each sheet, the plurality of fibers may form a network (e.g., a woven network, a nonwoven network (e.g., randomly or parallel), or another orientation). In various embodiments, outer ring 120 may be constructed from high strength and high modulus fibers, such as para-aramid synthetic fibers (i.e., KEVLAR fibers available from E.I. duPont de Nemours and Company), metal fibers, ceramic fibers, glass fibers, carbon fibers, boron fibers, p-phenylenetherephtalamide fibers, aromatic polyamide fibers, silicon carbide fibers, graphite fibers, nylon fibers, or mixtures thereof. Another example of suitable fibers includes ultra high molecular weight polyethylene, such as SPECTRA fibers manufactured by Honeywell International Inc.

In various other embodiments, the outer ring 120 includes a titanium or titanium alloy, a nickel or nickel alloy, or an aluminum or aluminum alloy material. In various embodiments, each alloy material may include chromium, cobalt, tungsten, tantalum, molybdenum, and/or rhenium, or combinations thereof. In still other embodiments, the outer ring 120 may include a steel, such as stainless steel.

Figure 3:
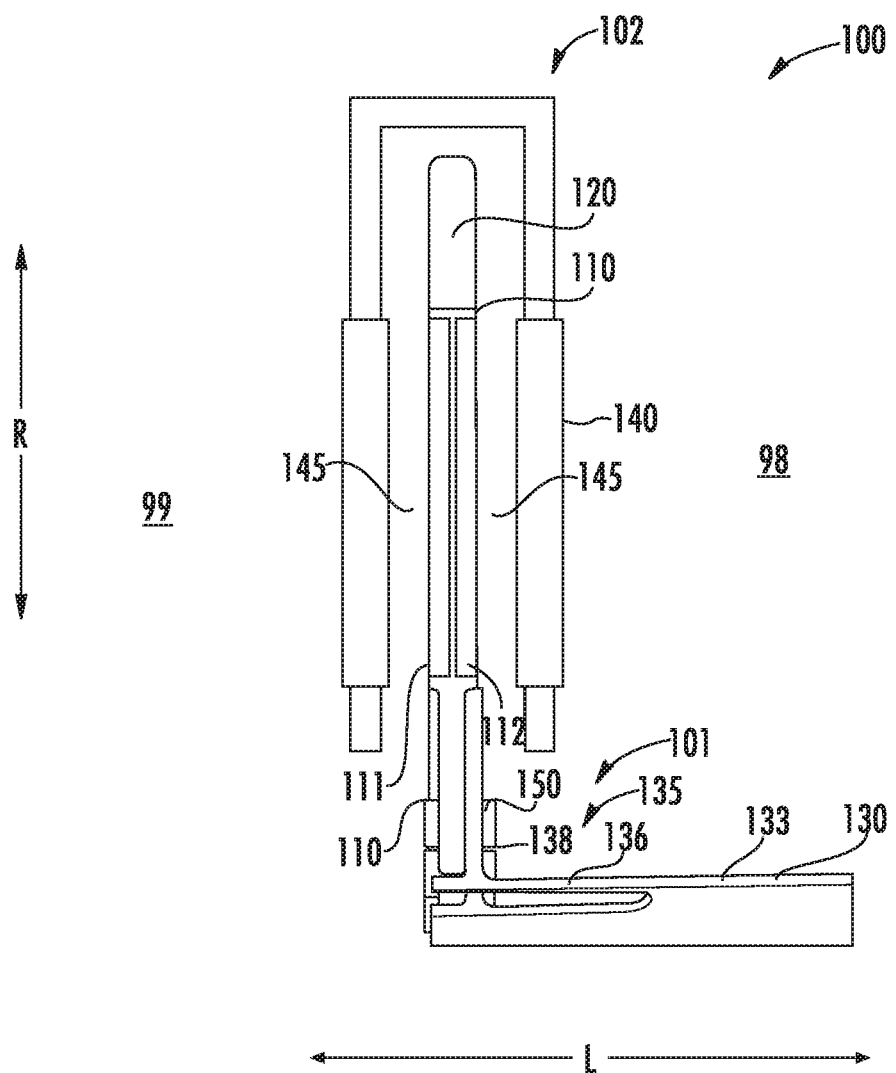
FIG. 3 is a cross sectional view of another exemplary embodiment of an electric machine according to an aspect of the present disclosure.

Referring now to FIG. 3, another exemplary embodiment of the electric machine 100 is generally provided. The electric machine 100 includes the rotor assembly 101 shown and described in regard to FIG. 2. In FIG. 3, the electric machine 100 further includes a stator assembly 102 adjacent along the longitudinal direction L to the plurality of carriers 110 of the rotor assembly 101. The stator assembly 102 may include a plurality of stator conductors 140 adjacent to the rotor magnet 111, 112 of each carrier 110. A clearance gap 145 is defined between the stator conductor 140 and the rotor magnet 111, 112.

In various embodiments, the electric machine 100 may define a permanent magnet generator. Rotation of the rotor assembly 101, via rotation of the driveshaft (e.g., the LP shaft 36, the HP shaft 34, etc.) may convert mechanical power from the engine 10 into electric power. The electric power may be utilized for various engine and aircraft subsystems. The stator assembly 102 may be coupled to an electrical load supplying electrical power to various systems.

Although rotor magnets 111, 112 and stator conductors 140 are referred to generally herein as "magnets," it should be appreciated that these magnets may be any suitable magnetic material, and may be permanent magnets, electromagnets, etc. For example, according to the illustrated embodiment, rotor magnets 111, 112 are permanent magnets and stator conductors 140 are ferromagnetic material with conductive windings, but alternative embodiments may use any suitable combination of rotor magnets 111, 112 and stator conductors 140 to generate an electrical load. In other embodiments, the rotor magnets 111, 112 and stator conductors 140 may be any suitable combination to generate a torque to rotate the rotor assembly 101 of the electric machine 100 (e.g., for a hybrid-electric powertrain). For example, the electric machine 100 and generate power to rotate a boundary layer ingestion (BLI) fan, or to operate an environmental control system (ECS), or to power various aircraft and engine avionics, pumps, services, or thermal management subsystems.

In addition, although stator assembly 140 may include concentrated windings, it should be appreciated that stator assembly 140 may alternatively have distributed windings or any other suitable stator winding configuration. Furthermore, rotor magnets 111, 112 and stator conductors 140 may include any suitable coating or covering, such as a metallic or non-metallic retaining structure, including a composite retaining structure.

In still various embodiments, the rotor magnets 111, 112 may define an alternating combination of rotor magnets 111, 112 defining a first direction 111 of magnetic flux and a second direction 112 of magnetic flux. For example, referring to FIG. 2, a first direction magnetic flux rotor magnet 111 may be defined in alternating combination with a second direction magnetic flux rotor magnet 112 along the circumferential direction C. As another example, referring to FIGS. 2 and 3, the first direction magnetic flux rotor magnet 111 may represent magnetic flux traveling from the second end 98 toward the first end 99 while the second direction magnetic flux rotor magnet 112 may represent magnetic flux traveling from the first end 99 toward the second end 98. Thus, the alternating orientations of rotor magnets 111, 112 along the circumferential direction C enable a magnetic flux circuit to be completed.

Referring now to FIGS. 2 and 3, the rotor assembly 101 of the electric machine 100 may define a fastening location 150 from each member 135 to each carrier 110. The member 135 may fasten to the carrier 110 via one or more mechanical fasteners or fastening methods. In various embodiments, the fastening location 150 may define a mechanical fastener, such as, but not limited to, a bolt, nut screw, rivet, pin, tie rod, etc. In another embodiment, the fastening location 150 may define a fastening method, such as, but not limited to, welding, soldering, brazing, or bonding, including adhesives. In still various embodiments, the fastening location 150 may define a feature, such as a mechanical fastener, within a slot extended along the radial direction R, such that the carrier 110 may displace along the radial direction R while generally retaining placement along the longitudinal direction L and/or the circumferential direction C.

Figure 4:
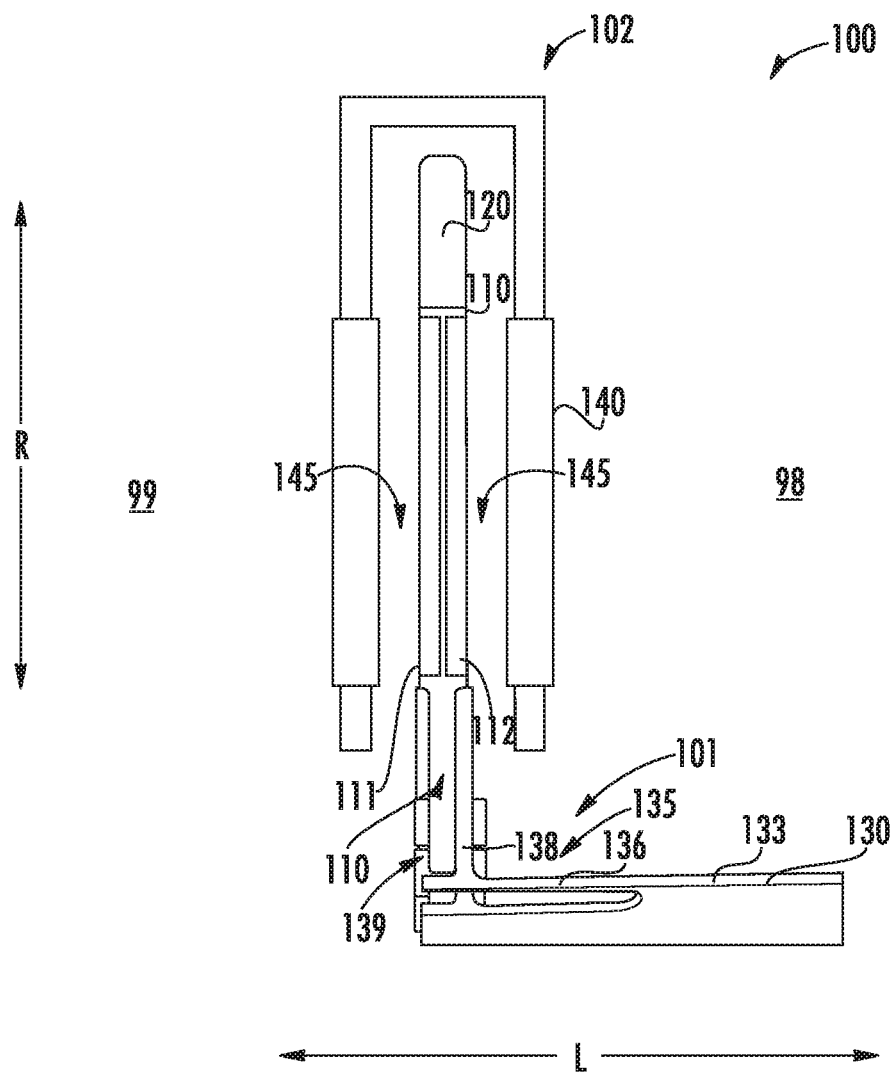
FIG. 4 is a cross sectional view of yet another exemplary embodiment of an electric machine according to an aspect of the present disclosure.

Referring now to FIG. 4, the electric machine 100 may be configured substantially similarly as shown and described in regard to FIGS. 1-3. However, in the embodiment shown in FIG. 4, the member 135 may define the second portion 138 of the member 135 on the second end 98 of each carrier 110 along the longitudinal direction L and further define a third portion 139 of the member 135 toward the first end 99 each carrier 110. The third portion 139 may define a generally radial portion substantially similar to the second portion 138. In the embodiment shown in FIG. 4, the hub 130 including the members 135 defining the second portion 138 and the third portion 139, such as shown in FIG. 4 toward the first end 99 and the second end 98 of each carrier 110, are a self-supporting structure into which each carrier 110 is housed and retained within each member 135 in the longitudinal direction L and/or the circumferential direction C while further enabling displacement along the radial direction R. Displacement of the carriers 110 along the radial direction R may enable transferring centrifugal loads from each carrier 110 to the outer ring 120 rather than the hub 130.

Referring now to FIGS. 1-3, the electric machine 100 including the rotor assembly 101 and the stator assembly 102 may be defined at one or more locations of the engine 10. In various embodiments, the engine 10 includes one or more frames 90 disposed within the fan assembly 14, the compressor section 21, and/or the turbine section 31. The rotor assembly 101 may be coupled to driveshaft defining the LP shaft 36, the HP shaft 36, and/or an IP shaft in a three-spool configuration. The stator assembly 102 may be coupled generally outward along the radial direction R of the rotor assembly 101. In various embodiments, the stator assembly 102 is coupled to the frame 90 in the fan assembly 14, or in the compressor section 21, or in the turbine section 31, or combinations thereof. In the turbine section, the stator assembly 102 may be coupled to an inner diameter of an exhaust frame of the turbine section 31 or one or more frames 90 disposed between or among the HP turbine 28 and LP turbine 30 (or the IP turbine in a three spool configuration). In the compressor section, the stator assembly 102 may be coupled to an inner diameter of the frame 90 disposed between the fan assembly 14 and the LP or IP compressor 22, and/or between the LP or IP compressor 22 and the HP compressor 24.

The electric machine 100 shown and described in regard to FIGS. 1-3 and in various embodiments herein may take advantage of the hoop stress carrying capability of the outer ring 120 to maximize the power to weight ratio (i.e., specific power) of the electric machine 100. The separate magnetic carriers 110 attached to the inner diameter of the outer ring 120 may further transfer centrifugal and tangential loads to and through the outer ring 120 rather than through the separated magnetic carriers 110. The members 135 of the hub 130 generally enable expansion and contraction along the radial direction to further enable transfer of loads to the outer ring 120 and response to any centripetal forces exerted onto the members 135. The circumferentially separated magnetic carriers 110 may not generally share hoop loads. The electric machine 100 may therefore enable high speed operation, such as approximately at or above shaft rotational speeds of 16000 revolutions per minute. It should further be appreciated that the electric machine 100 shown and described herein may enable scaling in size within the engine 10 to enable high speed operation up to approximately 100,000 revolutions per minute.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An electric machine defining a longitudinal direction, a radial direction, and a circumferential direction, and an axial centerline defined along the longitudinal direction, the electric machine comprising:
   a rotor assembly comprising a plurality of carriers arranged along the circumferential direction, wherein each pair of carriers defines a carrier gap therebetween along the circumferential direction, and wherein each carrier includes a separate rotor magnet, wherein the carrier gaps prevent transfer of hoop stresses from one carrier to another along the circumferential direction, and further wherein the rotor assembly comprises an outer ring radially outward of and surrounding the plurality of carriers along the circumferential direction, the outer ring defining a unitary structure attached to each of the plurality of carriers so as to transfer the hoop stresses from the plurality of carriers.

2. The electric machine of claim 1, wherein the rotor assembly further comprises a hub disposed radially inward of the plurality of carriers, wherein the hub is coupled to each carrier.

3. The electric machine of claim 2, wherein the hub comprises a plurality of members, wherein each member is coupled to each carrier.

4. The electric machine of claim 3, wherein the hub further comprises an inner ring to which the plurality of members is coupled.

5. The electric machine of claim 4, wherein each member defines a first portion and a second portion, wherein the second portion is coupled to the carrier and the first portion is coupled to the inner ring of the hub.

6. The electric machine of claim 3, wherein each member defines a second portion and a third portion, wherein the third portion is disposed toward a first end of each carrier and the second portion is disposed toward a second end of each carrier opposite of the first end along the longitudinal direction, and wherein each carrier is retained within each member along the longitudinal direction and/or circumferential direction.

7. The electric machine of claim 3, wherein the electric machine defines a load path from the inner ring of the hub to each of the plurality of members, and from each member to each carrier, and from the plurality of carriers to the outer ring.

8. The electric machine of claim 2, wherein the electric machine defines a load path from the hub to each carrier to the outer ring.

9. The electric machine of claim 1, wherein the outer ring defines a tangential stress carrying member.

10. The electric machine of claim 1, further comprising:
    a stator assembly adjacent along the longitudinal direction to the plurality of carriers.

11. The electric machine of claim 10, wherein the stator assembly comprises a plurality of stator conductors adjacent to the rotor magnet of each carrier, and wherein a clearance gap is defined between the stator conductor and the rotor magnet.

12. The electric machine of claim 1, wherein the outer ring comprises a ceramic matrix composite, a metal matrix composite, or a polymer matrix composite.

13. The electric machine of claim 12, wherein the outer ring comprises a plurality of fibers, and wherein the fibers include para-aramid synthetic fibers, metal fibers, ceramic fibers, glass fibers, carbon fibers, boron fibers, p-phenylenetherephtalamide fibers, aromatic polyamide fibers, silicon carbide fibers, graphite fibers, nylon fibers, ultra-high molecular weight polyethylene fibers, or mixtures thereof.

14. A gas turbine engine defining a longitudinal direction, a radial direction, and a circumferential direction, and an axial centerline defined along the longitudinal direction, the engine comprising:
an electric machine comprising a plurality of carriers arranged along the circumferential direction, wherein each pair of carriers defines a carrier gap therebetween, and wherein each carrier includes a separate rotor magnet, wherein the carrier gaps prevent transfer of hoop stresses from one carrier to another along the circumferential direction, and wherein the electric machine comprises an outer ring radially outward of and surrounding the plurality of carriers along the circumferential direction, wherein the outer ring defines a unitary structure attached to each of the plurality of carriers so as to transfer the hoop stresses from the plurality of carriers, and further wherein the electric machine further comprises a hub disposed radially inward of the plurality of carriers, wherein the hub retains each carrier along at least the longitudinal direction and the circumferential direction; and
a driveshaft extended along the longitudinal direction and rotatable about the axial centerline, wherein the hub of the electric machine is coupled to the driveshaft.

15. The gas turbine engine of claim 14, wherein the electric machine further defines a plurality of members, and wherein each member of the electric machine defines a first portion and a second portion, wherein the second portion is coupled to each carrier and the first portion is coupled to the inner ring.

16. The gas turbine engine of claim 14, wherein the electric machine further defines a plurality of members, and wherein each member defines a second portion and a third portion, wherein the third portion is disposed toward a first end of each carrier and the second portion is disposed toward a second end of each carrier opposite of the first end along the longitudinal direction, and wherein each carrier is retained within each member along the longitudinal direction and/or circumferential direction.

17. The gas turbine engine of claim 14, wherein the inner ring of the hub is coupled to the driveshaft.

18. The gas turbine engine of claim 14, wherein the driveshaft defines a low pressure shaft, intermediate pressure shaft, or a high pressure shaft.

19. The gas turbine engine of claim 14, the engine further comprising:
a stator assembly adjacent along the longitudinal direction to the plurality of carriers, wherein the stator assembly comprises a plurality of stator conductors adjacent to the rotor magnet of each carrier, and wherein a clearance gap is defined between the stator conductor and the rotor magnet.

20. The gas turbine engine of claim 19, the engine further comprising:
a frame disposed within a fan assembly, a compressor section, or a turbine section, and wherein the stator assembly is coupled to the frame.

* * * * *